(12) United States Patent
Bradley et al.

(10) Patent No.: US 12,500,388 B2
(45) Date of Patent: Dec. 16, 2025

(54) INTEGRATED SILICON STRUCTURES WITH OPTICAL GAIN MEDIATED BY RARE-EARTH-DOPED TELLURIUM-OXIDE-COATING

(71) Applicant: MCMASTER UNIVERSITY, Hamilton (CA)

(72) Inventors: Jonathan Bradley, Oakville (CA); Andrew Knights, Dundas (CA); Khadijeh Miarabbas Kiani, Hamilton (CA); Henry Frankis, Hamilton (CA); Dawson Bonneville, Hamilton (CA); Cameron Naraine, Hamilton (CA)

(73) Assignee: MCMASTER UNIVERSITY, Hamilton (CA)

(*) Notice: Subject to any disclaimer, the term of this patent is extended or adjusted under 35 U.S.C. 154(b) by 916 days.

(21) Appl. No.: 17/721,419

(22) Filed: Apr. 15, 2022

(65) Prior Publication Data
US 2022/0337021 A1    Oct. 20, 2022

Related U.S. Application Data

(60) Provisional application No. 63/201,161, filed on Apr. 15, 2021.

(51) Int. Cl.
*H01S 3/16* (2006.01)
*H01S 3/06* (2006.01)
(Continued)

(52) U.S. Cl.
CPC ...... *H01S 3/094049* (2013.01); *H01S 3/0604* (2013.01); *H01S 3/08009* (2013.01);
(Continued)

(58) Field of Classification Search
CPC ............ H01S 3/094049; H01S 3/0604; H01S 3/1616; H01S 3/0637
See application file for complete search history.

(56) References Cited

U.S. PATENT DOCUMENTS 10,468,849 B1    11/2019    Bradley et al.

OTHER PUBLICATIONS

Khadijeh M. Kiani et al. "A Thulium-Silicon Hybrid Microdisk Laser", Advance Photonics Congress (IPR, Networks, NOOMA, PVLED, SPPCom) OSA pp. 1-2 (Year: 2021).*

(Continued)

*Primary Examiner* — Tod T Van Roy
*Assistant Examiner* — Delma R Forde

(57) ABSTRACT

Hybrid silicon devices are disclosed in which a silicon-based resonant structure is coated with a rare-earth-doped tellurium oxide layer that facilitates optical gain, thereby forming a silicon-based laser cavity. The silicon-based laser cavity supports at least one resonant mode that has a modal volume extending from the silicon resonant base structure into the rare-earth-doped tellurium oxide layer. The silicon-based laser cavity is optically coupled to a silicon waveguide to facilitate the delivery of pump laser energy to the silicon-based laser cavity, such that at least a portion of the pump laser energy propagating through the silicon waveguide is coupled to the silicon-based laser cavity for excitation of the rare earth dopant within the rare-earth-doped tellurium oxide layer. The silicon waveguide that is optically coupled to the silicon-based laser cavity also facilitates the external delivery of the laser energy generated within silicon-based laser cavity.

34 Claims, 7 Drawing Sheets

(51) Int. Cl.
H01S 3/063 (2006.01)
H01S 3/08 (2023.01)
H01S 3/094 (2006.01)

(52) U.S. Cl.
CPC .......... H01S 3/1608 (2013.01); H01S 3/1616 (2013.01); H01S 3/1628 (2013.01)

(56) References Cited

OTHER PUBLICATIONS

Hamidu M. Mbonde et al. "Demonstration of passive, nonlinear, and active devices on a hybrid photonic platform" vol. 33, No. 2/Jan. 27, 2025/Optics Express pp. 1836-1847 (Year: 2025).*

Henry C. Frankis et al. "Erbium-doped TeO2-coated Si3N4 waveguide amplifiers with 5 dB net gain" vol. 8, No. 2 / Feb. 2020 / Photonics Research pp. 127-134 (Year: 2020).*

Khadijeh M. Kiani et al. "Four-wave mixing in high-Q tellurium-oxide-coated silicon nitride microring resonators" vol. 3, No. 12/Dec. 15, 2020/OSA Continuum pp. 3497-3507 (Year: 2020).*

Khadijeh M. Kiani et al. "High-Q TeO2-Si Hybrid Microring Resonators" Appl. Sci. 2022, 12, 1363, pp. 1-9 (Year: 2022).*

Borselli, A., PhD Thesis, "High-Q Microresonators as Lasing Elements for Silicon Photonics", California Institute of Technology, 2006, 228 pages.

Frankis, H. C. et al., "Tellurite glass microcavity resonators integrated on a silicon photonics platform", J. Opt. Microsys. 1, 1-12 (2021).

Frankis, H. C. et al., "A Tellurium Oxide Microcavity Resonator Sensor Integrated On-Chip with a Silicon Waveguide", Sensors 18, 4061 (2018), 12 pages.

Grivas, C., "Optically pumped planar waveguide lasers: Part II: Gain media, laser systems, and applications", Prog. Quan. Elec. 45-46, 3-160 (2016).

Li, N., "A Silicon Photonic Data Link with a Monolithic Erbium-Doped Laser", Nature Sci. Reports 10, 1114 (2020).

* cited by examiner

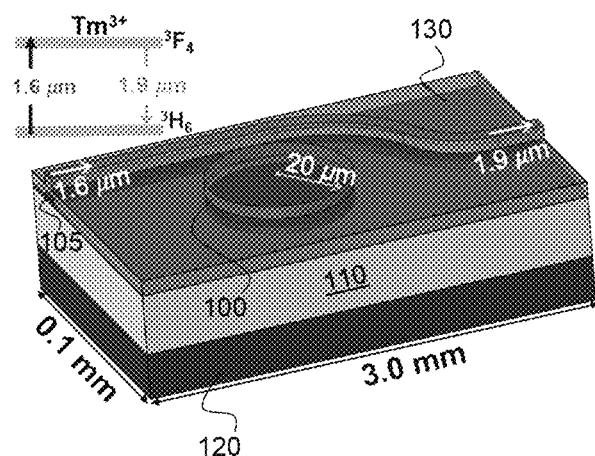
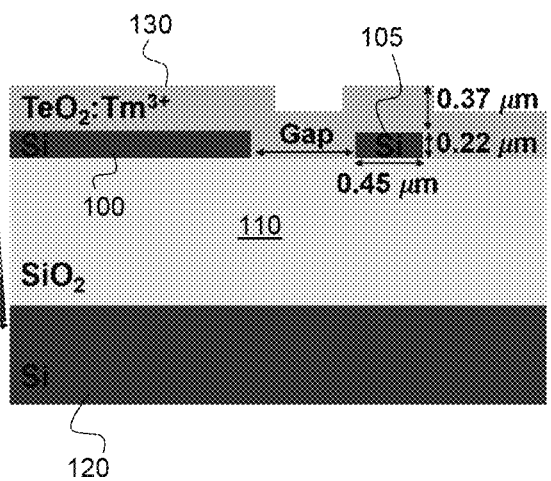
FIG. 1A    FIG. 1B
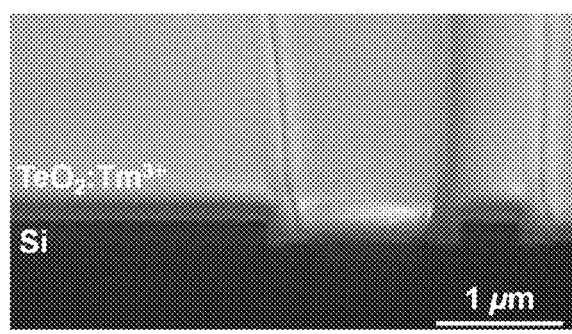
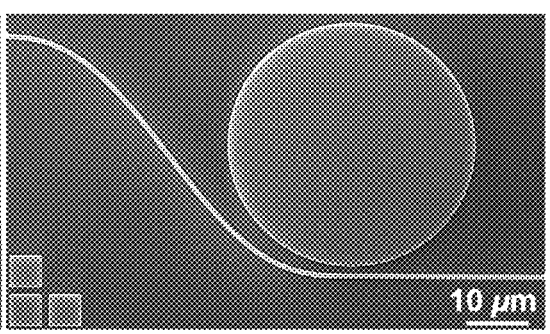
FIG. 2A    FIG. 2B

| | Wavelength (nm) | Si Overlap (%) | $TeO_2:Tm^{3+}$ Overlap (%) | Effective area ($\mu m^2$) |
|---|---|---|---|---|
| Microdisk | 1610 | 76.3 | 14.7 | 0.35 |
| | 1906 | 69.4 | 19.0 | 0.47 |
| Waveguide | 1610 | 66.1 | 24.2 | 0.20 |
| | 1906 | 51.7 | 35.0 | 0.34 | ed by reference.

INTEGRATED SILICON STRUCTURES WITH OPTICAL GAIN MEDIATED BY RARE-EARTH-DOPED TELLURIUM-OXIDE-COATING

CROSS-REFERENCE TO RELATED APPLICATIONS

This application claims priority to U.S. Provisional Patent Application No. 63/201,161, titled "THULIUM-SILICON HYBRID WAVEGUIDES AND LASERS" and filed on Apr. 15, 2021, the entire contents of which is incorporated herein by reference.

BACKGROUND

The present disclosure relates to photonics and integrated optical devices.

The development of integrated light sources is a persistent challenge in the field of silicon photonics. Silicon is an inefficient light-emitting material because it is an indirect bandgap semiconductor, thus electron-hole recombination must be mediated by phonon emission or absorption to conserve momentum. This makes radiative carrier recombination much less likely than non-radiative recombination. Further, light emission via carrier recombination is also limited to wavelengths <1.1 µm due to the 1.1 eV bandgap of silicon, which is below wavelengths compatible with low-loss silicon photonic microsystems. Various methods have been developed to build light sources onto silicon chips, including stimulated Raman emission in silicon, heterogeneously bonded or directly grown III-V semiconductors, germanium and germanium-tin alloys, silicon-nitride based parametric oscillators, and silicon-organic hybrid devices. While many promising results have been reported, each method suffers from one or more significant drawbacks, including high fabrication complexity, high cost, low yield, and/or inefficient performance under standard operating conditions. Therefore, in most applications, the light source is still located externally from the silicon chip.

One attempt to integrate light sources on a silicon photonics platform focused on introducing rare-earth dopants directly in silicon. Unfortunately, the performance of the device was hampered by its low rare-earth solubility (Kenyon, A. J. Erbium in silicon. Semicond. Sci. Technol. 20, R65-R84, 2005). In another notable attempt to directly integrate dopants with integrated silicon photonic components (M. Borselli, Ph.D. Thesis, California Institute of Technology, Pasadena, CA 2006), a silicon microdisk was coated with Erbium-doped glass and optically pumped via the indirect coupling with an optical fiber. Unfortunately, neither of these studies successfully demonstrated lasing of a silicon-based resonant structure with the coupling of output laser energy into an integrated silicon waveguide. Moreover, both of these studies employed high-temperature deposition process steps that are incompatible with integrated silicon photonic chips having active devices.

SUMMARY

Hybrid silicon devices are disclosed in which a silicon-based resonant structure is coated with a rare-earth-doped tellurium oxide layer that facilitates optical gain, thereby forming a silicon-based laser cavity. The silicon-based laser cavity supports at least one resonant mode that has a modal volume extending from the silicon resonant base structure into the rare-earth-doped tellurium oxide layer. The silicon-based laser cavity is optically coupled to a silicon waveguide to facilitate the delivery of pump laser energy to the silicon-based laser cavity, such that at least a portion of the pump laser energy propagating through the silicon waveguide is coupled to the silicon-based laser cavity for excitation of the rare earth dopant within the rare-earth-doped tellurium oxide layer. The silicon waveguide that is optically coupled to the silicon-based laser cavity also facilitates the external delivery of the laser energy generated within silicon-based laser cavity.

Accordingly, in one aspect, there is provided an optical system comprising:
an optical device comprising:
  a substrate;
  a dielectric layer formed on said substrate, said dielectric layer having a refractive index less than that of silicon;
  a silicon waveguide formed on said dielectric layer;
  a silicon-based laser cavity formed on said dielectric layer, said silicon-based laser cavity comprising:
    a silicon resonant base structure; and
    a doped tellurium oxide layer formed on said silicon resonant base structure, said doped tellurium oxide layer comprising a rare earth dopant; and
  a pump laser configured to deliver pump laser energy to said silicon waveguide;
wherein said silicon-based laser cavity is optically coupled to said silicon waveguide such that at least a portion of the pump laser energy propagating through said silicon waveguide is coupled to said silicon-based laser cavity for excitation of said rare earth dopant within said doped tellurium oxide layer; and
wherein a thickness of said doped tellurium oxide layer and a concentration of said rare earth dopant are selected to facilitate gain and lasing for at least one resonant mode within said silicon-based laser cavity in response to excitation of said rare earth dopant by said pump laser energy, said at least one resonant mode having a modal volume that extends from said silicon resonant base structure into said doped tellurium oxide layer; and
wherein laser energy generated within said silicon-based laser cavity is coupled to and propagates within said silicon waveguide.

In some example implementations of the system, the silicon resonant base structure comprises a silicon microdisk.

In some example implementations of the system, the rare earth dopant comprises thulium. A pump wavelength of the pump laser may be selected such that stable lasing is achieved in the absence of active thermal regulation of the silicon-based laser cavity. The laser energy may have a wavelength between 1.7 and 2.1 microns. The silicon waveguide may be in optical communication with or form a portion of a silicon-waveguide-based integrated optical device, integrated on the substrate, the silicon-waveguide-based integrated optical device being configured for operation with an operating wavelength band that resides within the range of 1.7 and 2.1 microns.

In some example implementations of the system, the rare earth dopant comprises Erbium.

In some example implementations of the system, the silicon resonant base structure comprises a silicon ring resonator or silicon racetrack resonator.

In some example implementations of the system, the silicon waveguide is pulley-coupled to the silicon-based laser cavity.

In some example implementations of the system, the silicon resonant base structure comprises a distributed-feedback waveguide segment that is directly integrated with the silicon waveguide.

In some example implementations of the system, the silicon resonant base structure is a Fabry-Perot cavity or a loop mirror cavity.

In some example implementations of the system, the silicon waveguide has a height between 10 and 4000 nm and is fully etched down to the dielectric layer to form a strip waveguide.

In some example implementations of the system, the silicon waveguide has a height between 10 and 4000 nm and is partially etched to form a ridge waveguide.

In some example implementations of the system, the thickness of the doped tellurium oxide layer is between 10 to 10000 nm.

In some example implementations of the system, the doped tellurium oxide layer and the silicon resonant base structure have dimensions such that the at least one resonant mode has an effective mode area less than 100 square microns.

In some example implementations of the system, the doped tellurium oxide layer resides on at least a portion of the silicon waveguide, thereby forming a hybrid silicon-tellurium-oxide waveguide. The doped tellurium oxide layer and the silicon waveguide may have dimensions such that the hybrid silicon-tellurium-oxide waveguide has a minimum bend radius of less than 1 mm.

In some example implementations of the system, the silicon-based laser cavity is evanescently coupled to the silicon waveguide, and wherein a gap between the silicon waveguide and the silicon-based laser cavity is less than 10 μm.

In some example implementations of the system, a resonant property of the silicon resonant base structure is formed by one or more patterning features.

In some example implementations of the system, the silicon waveguide is in optical communication with or forms a portion of a silicon-waveguide-based integrated optical device, integrated on the substrate, the silicon-waveguide-based integrated optical device further comprising an integrated optical component selected from the group consisting of a directional coupler, multimode interferometer, Mach Zehnder interferometer, waveguide Bragg grating, and distributed Bragg reflector.

In some example implementations of the system, the silicon waveguide is in optical communication with or forms a portion of a silicon-waveguide-based integrated optical device, integrated on the substrate, the silicon-waveguide-based integrated optical device further comprising an integrated optical component selected from the group consisting of amplifiers, lasers, nonlinear optical devices, acousto-optical devices, multiwavelength sources, and optical sensors.

In some example implementations of the system, the doped tellurium oxide layer is in direct contact with at least a portion of the silicon resonant base structure.

In some example implementations of the system, the dielectric layer is a first dielectric layer, and wherein an intermediate dielectric layer is provided between the doped tellurium oxide layer and the silicon resonant base structure.

In some example implementations of the system, an additional metal heater layer is included proximal to the silicon-based laser cavity to facilitate thermal tuning of resonant properties of the silicon-based laser cavity.

In some example implementations of the system, the silicon resonant base structure is doped to facilitate tuning of resonant properties of the silicon-based laser cavity by heating.

In some example implementations of the system, the silicon resonant base structure is doped to enable injection or depletion of charge carriers.

In another aspect, there is provided an integrated optical device comprising:
  a substrate;
  a dielectric layer formed on the substrate, the dielectric layer having a refractive index less than that of silicon;
  a silicon waveguide formed on the dielectric layer;
  a silicon-based laser cavity formed on the dielectric layer, the silicon-based laser cavity comprising:
    a silicon resonant base structure; and
    a doped tellurium oxide layer formed on the silicon resonant base structure, the doped tellurium oxide layer comprising a rare earth dopant; and
  wherein the silicon-based laser cavity is optically coupled to the silicon waveguide such that when pump laser energy having a suitable wavelength is delivered to the silicon waveguide, at least a portion of the pump laser energy is coupled to the silicon-based laser cavity for excitation of the rare earth dopant within the doped tellurium oxide layer; and
  wherein a thickness of the doped tellurium oxide layer and a concentration of the rare earth dopant are selected to facilitate gain and lasing for at least one resonant mode within the silicon-based laser cavity in response to excitation of the rare earth dopant by the pump laser energy, the at least one resonant mode having a modal volume that extends from the silicon resonant base structure into the doped tellurium oxide layer.

In another aspect, there is provided a method of forming an integrated silicon-based laser device, the method comprising:
  processing a silicon-on-insulator substrate to define thereon:
    a silicon waveguide; and
    a silicon resonant base structure; and
  depositing, according to a low-temperature deposition process with a temperature below 300 degrees Celsius, a doped tellurium oxide layer comprising a rare earth dopant, such that the doped tellurium oxide layer is formed over at least the silicon resonant base structure, thereby forming a silicon-based laser cavity;
  wherein the silicon waveguide and the silicon resonant base structure are defined such that the silicon-based laser cavity is optically coupled to the silicon waveguide, and such that when pump laser energy having a suitable wavelength is delivered to the silicon waveguide, at least a portion of the pump laser energy is coupled to the silicon-based laser cavity for excitation of the rare earth dopant within the doped tellurium oxide layer; and
  wherein a thickness of the doped tellurium oxide layer and a concentration of the rare earth dopant are selected to facilitate gain and lasing for at least one resonant mode within the silicon-based laser cavity in response to excitation of the rare earth dopant by the pump laser energy.

In some example implementations of the method, the silicon-on-insulator substrate is processed to form at least one passive integrated optical component prior to deposition of the doped tellurium oxide layer, the at least one passive integrated optical component being in optical communication with the silicon waveguide.

In some example implementations of the method, the silicon-on-insulator substrate is processed to form at least one active integrated optical component prior to deposition of the doped tellurium oxide layer, the at least one active integrated optical component being in optical communication with the silicon waveguide.

In some example implementations of the method, a resonant feature of the silicon resonant base structure is formed by a patterning step prior to depositing the doped tellurium oxide layer.

In some example implementations, the method further comprises forming an intermediate dielectric layer one or both of the silicon waveguide and the silicon resonant base structure prior to depositing the doped tellurium oxide layer.

In some example implementations of the method, prior to deposition of the doped tellurium oxide layer, an additional dielectric layer with refractive index lower than silicon is deposited on the silicon resonant base structure and a window is etched into the additional dielectric layer.

In another aspect, there is provided an integrated optical device comprising:
  a substrate;
  a first dielectric layer formed on the substrate, the first dielectric layer having a refractive index less than that of silicon;
  a silicon waveguide formed on the first dielectric layer; and
  a doped tellurium oxide layer comprising a rare earth dopant, the doped tellurium oxide layer being conformally disposed over the silicon waveguide such that the doped tellurium oxide layer extends laterally in a planar configuration on either side of the silicon waveguide while forming a conformal raised region over the silicon waveguide, such that the doped tellurium oxide layer and the silicon waveguide form a hybrid optical waveguide;
  wherein a thickness of the doped tellurium oxide layer and a concentration of the rare earth dopant are selected to facilitate gain for a guided mode within the hybrid optical waveguide in response to excitation of the rare earth dopant by pump laser energy delivered through the hybrid optical waveguide, thereby facilitating amplification of the guided mode, wherein the guided mode has a modal volume that extends from the silicon waveguide into the doped tellurium oxide layer.

In another aspect, there is provided an integrated optical device comprising:
  a substrate;
  a dielectric layer formed on the substrate, the dielectric layer having a refractive index less than that of silicon;
  a silicon waveguide formed on the dielectric layer;
  a silicon-based laser cavity formed on the dielectric layer, the silicon-based laser cavity comprising:
    a silicon resonant base structure; and
    a doped metal oxide layer formed on the silicon resonant base structure, the doped metal oxide layer comprising a rare earth dopant; and
  wherein the silicon-based laser cavity is optically coupled to the silicon waveguide such that when pump laser energy having a suitable wavelength is delivered to the silicon waveguide, at least a portion of the pump laser energy is coupled to the silicon-based laser cavity for excitation of the rare earth dopant within the doped metal oxide layer; and
  wherein a thickness of the doped metal oxide layer and a concentration of the rare earth dopant are selected to facilitate gain and lasing for at least one resonant mode within the silicon-based laser cavity in response to excitation of the rare earth dopant by the pump laser energy, the at least one resonant mode having a modal volume that extends from the silicon resonant base structure into the doped metal oxide layer.

In another aspect, there is provided an integrated optical device comprising:
  a substrate;
  a first dielectric layer formed on the substrate, the first dielectric layer having a refractive index less than that of silicon;
  a silicon waveguide formed on the first dielectric layer; and
  a doped metal oxide layer comprising a rare earth dopant, the doped metal oxide layer being conformally disposed over the silicon waveguide such that the doped metal oxide layer extends laterally in a planar configuration on either side of the silicon waveguide while forming a conformal raised region over the silicon waveguide, such that the doped metal oxide layer and the silicon waveguide form a hybrid optical waveguide;
  wherein a thickness of the doped metal oxide layer and a concentration of the rare earth dopant are selected to facilitate gain for a guided mode within the hybrid optical waveguide in response to excitation of the rare earth dopant by pump laser energy delivered through the hybrid optical waveguide, thereby facilitating amplification of the guided mode, wherein the guided mode has a modal volume that extends from the silicon waveguide into the doped metal oxide layer.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 1A shows 3D illustration of an example $TeO_2$:$Tm^{3+}$-coated silicon microdisk laser. Inset: Two-level $Tm^{3+}$ energy diagram showing 1.6 μm photon absorption and excitation into upper level and de-excitation into the lower level and 1.9 μm photon emission.

FIG. 1B shows the cross-section profile of the example $TeO_2$:$Tm^{3+}$-coated Si microdisk laser showing the example microdisk structure and the bus waveguide dimensions.

FIG. 2A shows a focused ion beam milled scanning electron microscope (SEM) cross-section image of the coupling region between the $TeO_2$:$Tm^{3+}$-coated Si microdisk and bus waveguide.

FIG. 2B shows a top-view SEM image of a $TeO_2$:$Tm^{3+}$-coated Si microdisk laser.

DETAILED DESCRIPTION

Figures 3, 4:
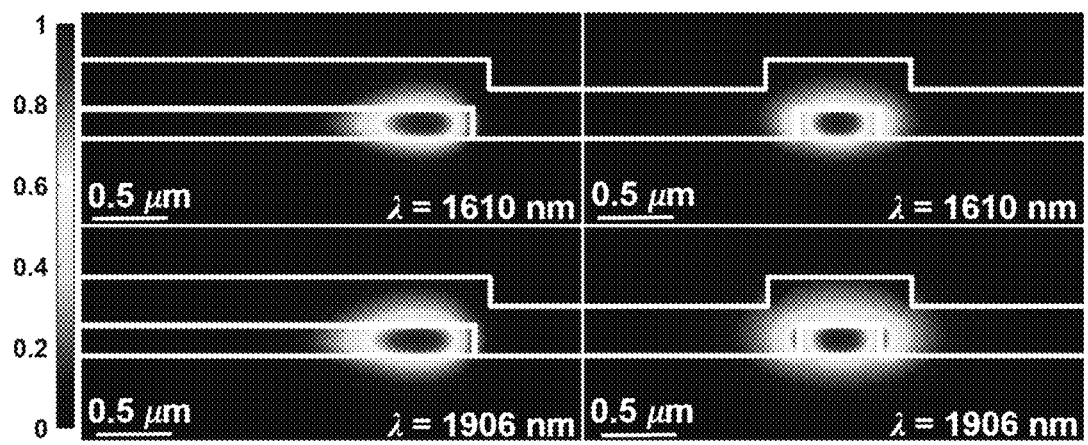
FIG. 3 shows calculated pump and laser modes. Calculated electric field profiles of the fundamental transverse-electric- (TE-) polarized mode for the laser wavelength using a finite-element method mode solver are shown for the $TeO_2$:$Tm^{3+}$-coated silicon microdisk (top left), the $TeO_2$:$Tm^{3+}$-coated silicon strip waveguide at the 1610 nm pump wavelength (top right), microdisk (bottom left), and waveguide at the 1906 nm lasing wavelength (bottom right).
FIG. 4 is a table showing calculated fractional optical intensity overlaps and effective mode areas for the fundamental TE microdisk mode at the 1610 nm pump and 1906 nm lasing wavelengths.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

Unless defined otherwise, all technical and scientific terms used herein are intended to have the same meaning as commonly understood to one of ordinary skill in the art. Unless otherwise indicated, such as through context, as used herein, the following terms are intended to have the following meanings:

As used herein, the phrase "tellurium oxide" refers to stoichiometric tellurium oxide ($TeO_2$) and other tellurium-based compositions, such as tellurium dioxide doped with other elements to form multicomponent tellurite glass. A tellurium oxide layer may include one or more dopants, such as, but not limited to, rare earth dopants.

As used herein, the phrase "visible" corresponds to a wavelength range spanning 0.4 to 0.7 μm.

As used herein, the phrase "near-infrared" corresponds to a wavelength range spanning 0.7 to 2.0 μm.

As used herein, the phrase "mid-infrared" corresponds to a wavelength range spanning 2.0 to 8.0 μm.

As used herein, the phrase "infrared" refers to the near-infrared and mid-infrared spectral ranges.

The phrase "waveguide", as used herein, may refer to any elongate segment that is capable of guiding one or more modes. A waveguide may be passive, active, or a combination thereof, and may include additional features, such as patterns for coupling and/or feedback, and may be doped. For example, a waveguide may form a portion or segment of a device such as a laser, amplifier, linear resonant cavity, ring resonator, acousto-optical switch, waveguide coupler, and/or other features and devices.

In view of the failure of the aforementioned previous attempts to demonstrate optical gain in an integrated silicon-based photonics platform, some of the present inventors had previously decided to abandon silicon as an underlying structure for a resonator and waveguide, turning instead to designs the employ silicon nitride (SiN) as an underlying material. In particular, in U.S. Pat. No. 10,468,849 (Bradley et al.), an integrated optical platform for achieving optical gain in a silicon-nitride-based integrated photonic device is disclosed in which a silicon nitride waveguide is coated with a rare-earth-doped layer of tellurium oxide.

Bradley et al. highlight tellurium oxide as a preferred doped-oxide layer for coating a silicon nitride waveguide due to the similarity between the refractive indices of tellurium oxide (~2.1 in the near infrared) and silicon nitride (~2.0 in the near infrared). Moreover, Bradley et al. disclose that the use of a silicon nitride waveguide coated with an overlying layer of doped tellurium oxide is particularly attractive because silicon nitride waveguides facilitate the generation of small feature sizes suitable for the fabrication of resonant and active devices such as cavities and lasers, while avoiding the high losses due to sidewall scattering that have plagued prior attempts to develop such devices based on high-refractive-index-contrast materials such as silicon.

While the work of Bradley et al. successfully demonstrated the use of rare-earth doped tellurium oxide as a suitable coating layer for silicon nitride waveguides, the focus of this work on the importance of the similarity between the refractive indices of silicon nitride and tellurium oxide biased the present inventors away from adapting rare-earth-doped tellurium oxide layers as a coating layer for silicon waveguides. The present inventors were further biased away from such attempts based on the known problems associated with the high propagation loss in silicon waveguides. Furthermore, the present inventors were biased against such an adaptation because of the potential impact of two-photon mediated free-carrier absorption on propagation loss in silicon waveguides and silicon resonant structures, which could further hinder the ability to achieve laser action in an integrated resonant silicon-based structure.

The present inventors, however, motivated by the strong commercial need for a silicon-based platform that would facilitate lasing in a more compact and straightforward manner, reasoned that despite the significant refractive index difference between tellurium oxide and silicon, and despite the higher losses associated with propagation in silicon waveguides, it was possible that a rare-earth-doped tellurium oxide coating, if doped appropriately and if provided with a sufficient thickness, and also if applied to a silicon resonant structure having sufficiently low propagation loss, could nonetheless potentially lead to successful lasing in an integrated silicon photonic device, thereby potentially enabling a path to a low-cost, scalable approach to rare-earth lasers on silicon. Moreover, the present inventors reasoned that if such a device was formed using thulium as a rare earth dopant in tellurium oxide, the resulting laser wavelength in the range of 1.8-2.1 microns that is associated with thulium emission would be less susceptible to two-photon mediated free-carrier absorption and thus potentially be more amendable to successful lasing in an integrated silicon-based platform. As described below and shown in the Examples that follow, the inventors, though experimentation, were able to confirm that lasing is indeed possible in such a hybrid, silicon-based integrated platform.

Accordingly, in various example embodiments of the present disclosure, hybrid silicon devices are disclosed in which a silicon-based resonant structure is coated with a rare-earth-doped tellurium oxide layer that facilitates optical gain, thereby forming a silicon-based laser cavity. The silicon-based laser cavity supports at least one resonant mode that has a modal volume extending from the silicon resonant base structure into the rare-earth-doped tellurium oxide layer. The silicon-based laser cavity is optically coupled to a silicon waveguide to facilitate the delivery of pump laser energy to the silicon-based laser cavity, such that at least a portion of the pump laser energy propagating through the silicon waveguide is coupled to the silicon-based laser cavity for excitation of the rare earth dopant within the rare-earth-doped tellurium oxide layer. The silicon waveguide that is optically coupled to the silicon-based laser cavity also facilitates the external delivery of the laser energy generated within silicon-based laser cavity, for example, to one or more additional silicon-based photonic devices that are integrated on a common platform (e.g. substrate).

As described below, and as illustrated in the examples below, the thickness of the rare-earth-doped tellurium oxide layer and the concentration of the rare earth dopant are selected to facilitate gain and lasing for at least one resonant mode within the silicon-based laser cavity, in response to excitation of the rare earth dopant by the pump laser energy.

Referring now to FIGS. 1A and 1B, an example hybrid silicon laser device is illustrated. FIG. 1A shows an isometric illustration of an example hybrid silicon laser device and energy level diagram for $Tm^{3+}$ showing the energy bands and transitions most relevant for the laser operation. A cross section diagram of the example hybrid silicon laser device is shown in FIG. 1B. In the present example embodiment, a silicon microdisk 100, which is a non-limiting example of a silicon resonant base structure, and a silicon waveguide 105, are shown in a SOI configuration, residing on a silicon oxide layer 110 with an underlying silicon substrate 120. The silicon microdisk 100 and the silicon waveguide 105 are coated with a thulium-doped tellurium oxide layer 130. The coated silicon microdisk thereby forms an example silicon-based laser cavity. The doped-tellurium-oxide-coated silicon microdisk is optically coupled to the silicon waveguide, shown in the present example in a non-limiting point-coupled configuration. While the use of thulium as a dopant may be preferred in some implementations, it will be understood that other rare earth dopants may be employed in the alternative, as described further below.

Pump laser light coupled to the silicon waveguide 105 (e.g. externally coupled via a fiber laser) propagates through the waveguide 105 and is optically coupled to the coated silicon microdisk, where it excites the thulium dopant residing with the tellurium oxide coating and facilitates gain for a guided mode within the emission bandwidth of the thulium dopant, the guided mode having a modal volume that extends into the tellurium oxide coating.

The thickness of the tellurium oxide layer and the doping concentration of the rare earth dopant are selected to facilitate gain for the resonant mode. For example, the present inventors have found that a suitable thickness range for the rare-earth doped tellurium oxide layer may be within the range of 10-100 nm (e.g. for coating silicon structures with a thicknesses of approximately 3 microns), 100-500 nm (e.g. for coating silicon structures with thicknesses of approximately 220 nm), and 200-2000 nm (e.g. for coating silicon structures with thicknesses of approximately 90 nm). Alternative example ranges for the tellurium oxide layer include 200-1000 nm and 4 microns to 10 microns. Example dopant concentrations for the rare earth dopants $1 \times 10^{20}$ to $6 \times 10^{20}$ $cm^{-3}$, $1 \times 10^{20}$ to $10 \times 10^{20}$ $cm^{-3}$.

It will be understood that a suitable thickness of the doped tellurium oxide layer and a suitable doping concentration of the rare earth dopant for achieving gain and lasing will vary depending on various device parameters, such as, propagation loss in the coated silicon-based laser cavity, pump laser power, pump laser wavelength, and coupling between the silicon waveguide and the silicon-based laser cavity. The skilled artisan may perform experiments to vary one or more parameters in order to select a parameter set that is suitable for achieving gain for a given implementation.

The geometry of the silicon resonant base structure and the thickness of the rare-earth-doped tellurium oxide layer may be selected such that at least one resonant mode of the silicon-based laser cavity has an effective mode area less than 100 square microns.

In some example implementations, the silicon waveguide may have a height between 10 and 4000 nm. The silicon waveguide may be fully etched down to said dielectric layer to form a strip waveguide, or partially etched to form a ridge waveguide.

While the example embodiment shown in FIGS. 1A and 1B employs a silicon microdisk as an integrated silicon resonant base structure, it will be understood that a wide range of silicon-based resonant structures may be employed to form a silicon-based laser cavity. Non-limiting examples of alternative silicon resonant structures include ring resonators, racetrack resonators, Fabry-Perot cavities, loop mirror cavities. Moreover, while some example embodiments may involve the evanescent coupling of the silicon waveguide to the silicon-based laser cavity, in other example embodiments, the silicon-based laser cavity may be a silicon waveguide segment that includes resonant features, such as a distributed feedback waveguide segment. Moreover, while the example embodiment shown in FIG. 1A illustrates a point-coupled configuration, other coupling configurations, such as a pulley-coupled configuration, may be employed in the alternative. A portion of the silicon waveguide that is coated with the tellurium oxide layer may have a bend radius of less than 1 mm. A gap between the silicon waveguide and the silicon-based laser cavity may be less than 10 μm.

It will be understood that the device configurations shown in FIGS. 1A and 1B are merely intended to illustrate non-limiting example embodiments, and that the illustrated configurations can be modified without departing from the intended scope of the present disclosure. For example, while FIGS. 1A and 1B show device features with sharp orthogonal corners, fabricated devices may have rounded corners, and the shape (profile) of the top surface of the conformal tellurium oxide layer 130 need not exactly match the shape (profile) of the underlying silicon structures.

While FIGS. 1A and 1B illustrate example embodiments in which the tellurium oxide layer 130 directly contacts the underlying silicon structures, in other example embodiments, one or more intermediate conformal layers (which may have a refractive index less than that of tellurium oxide) may be disposed between the silicon structures and the tellurium oxide layer 130. For example, a conformal silicon oxide layer may be formed over the silicon structures and under the tellurium oxide layer 130 such that the silicon structures and the tellurium oxide layer 130 mutually support a common optical mode.

Furthermore, although the doped tellurium oxide layer is shown in FIGS. 1A and 1B as extending over both the silicon resonant base structure, in other example implementations the doped tellurium oxide layer may only cover the silicon resonant base structure without covering the silicon waveguide, or may cover the silicon resonant base structure while only covering a portion of the silicon waveguide. Furthermore, the doping of the tellurium oxide layer may be localized to the portion of the tellurium oxide layer that covers the silicon resonant base structure, or the tellurium oxide layer that covers the silicon resonant base structure may be doped with a higher concentration than the tellurium oxide layer that covers the silicon waveguide.

In some example implementations, the substrate 120 may be silicon. In other example implementations, the substrate may be formed from other example materials, such as, but not limited to, glass, quartz, sapphire, and germanium. In some example implementations, the dielectric layer may be formed from silicon oxide (e.g. $SiO_2$). In other example implementations, the dielectric may be formed from other example materials, such as, but not limited to, multicomponent glass, quartz, or sapphire.

In the present example embodiment, the rare earth dopant is thulium. Trivalent thulium ions are a quasi-three level laser system with thermally-populated broadened Stark-split ground and excited states, which can be pumped at telecom wavelengths around 1.6 μm and show broad emission from ~1.7-2.1 μm on the $^3F_4$ excited state to $^3H_6$ ground state energy transition. $Tm^{3+}$ ions exhibit relatively shifted absorption and emission spectra (resulting in low ground state absorption at longer laser wavelengths), minimal quenching effects at high ion concentrations and emission near the edge of silicon's low two-photon absorption window, allowing for straightforward population inversion in the laser cavity and efficient optical pumping and lasing. However, while high efficiency on-chip thulium lasers have been demonstrated in crystalline waveguides and dielectric host materials on silicon substrates, thulium is relatively unexplored as a laser ion in an SOI platform.

In other example implementations, other rare earth dopants may be employed, such as Er and Pr. For rare earth doped amplifiers and lasers, tellurium oxide offers a number of advantages over other materials because of its larger emission cross sections, higher refractive index thus more compact devices, large emission bandwidth, low ion-to-ion cross relaxation and quenching, and low optical loss throughout visible and infrared wavelengths. Also, high rare earth solubility and high optical gain have been demonstrated in tellurium oxide thin films and waveguides. Because of its low phonon energies, thus longer luminescence lifetimes for some electronic transitions, tellurium oxide also may enable efficient lasing and amplification at wavelengths not available with other conventional rare-earth-doped oxides (e.g. 1.3 um using Pr, 1.4 um and 2.0 um using Tm).

In some example embodiments, the pump wavelength may be selected such that stable lasing is achieved in the absence of active thermal regulation of said silicon-based laser cavity. For example, as a consequence of the strong thermo-optic effect of silicon, a closed-loop stable control of the hybrid silicon-based laser may be achieved when pumped energy is provided on the blue-side of resonance. In other example embodiments, integration of rare-earth gain materials with silicon can enable active optoelectronic or highly efficient thermo-optic laser control via doping the silicon. For example, the tellurium oxide layer may be doped to facilitate tuning of resonant properties of the silicon-based laser cavity by heating, or to enable injection or depletion of charge carriers. In other example implementations, thermal regulation may be achieved via the inclusion of a metal heater proximal to the silicon-based laser cavity.

In some example implementations, the silicon resonant structure is patterned by masked lithography techniques (contact lithography, stepper lithography, immersion lithography) or direct-write methods (e-beam lithography or UV laser resist mask patterning) to generate one or more resonant features. For example, patterning may be employed to add additional features, such as those suitable for achieving resonator structures. It will be understood that steps such as patterning and doping can vary from structure to structure depending on the feature sizes and performance required. Patterning steps can pertain to, but are not limited to the following example methods: electron-beam lithography, masked optical lithography and other nano-patterning techniques.

In some example embodiments, prior to deposition of the doped tellurium oxide layer, an additional dielectric layer with refractive index lower than silicon may be deposited on the silicon resonant base structure and a window may be etched into the additional dielectric layer. Besides this enabling integration with other Si photonic devices, it allows for more efficient fiber-chip pump/signal light coupling through a regular $SiO_2$-clad Si inverse taper coupler.

Although many of the preceding example embodiments have employed rare-earth-doped tellurium oxide as a coating layer for coating an underlying silicon resonant structure, it will be understood that in other example embodiments, an alternative high-index metal oxide material may be employed. Non-limiting examples of suitable alternative oxide materials include oxides such as bismuth oxide, titanium dioxide, and tantalum pentoxide (with refractive indices typically between 2-2.4). In other example embodiments, the conformal coating layer may be formed from aluminum oxide or germanium oxide.

Compared to other silicon-based light sources, the hybrid silicon-based integrated laser devices (and/or amplifiers) disclosed herein can be straightforward, robust, scalable, low-cost and can be implemented using existing wafer-scale silicon photonics fabrication processes, with a post-processing temperature range, for example, under 300° C., under 200° C., or even down to room-temperature. Moreover, in contrast to previous rare-earth lasers, the hybrid design involving the coating of a silicon resonant base structure with rare-earth-doped tellurium oxide is simple, the laser cavity and output are directly in the silicon layer, and the ultra-compact device size, with lateral dimensions of less than 50 µm, is on a scale compatible with standard passive and active silicon photonic devices.

While many of the present example embodiments relate to hybrid silicon-based integrated lasers, the present example embodiments may be adapted for the development of hybrid silicon-based integrated amplifiers. For example, a silicon waveguide may be coated with a rare-earth-doped tellurium oxide layer and optically pumped to generate gain. The present example embodiments may thus facilitate the development of ultra-compact optical amplifiers, which can be another missing element in commercial silicon photonics process design kits. Moreover, in addition to thulium-based devices, these present example embodiments may be extended to other rare-earth-silicon hybrid lasers and amplifiers operating in a wide range of wavelengths.

Furthermore, compared to recent rare-earth lasers on silicon photonics platforms based on silicon nitride cavities, the hybrid silicon-based integrated lasers of the present disclosure may be significantly less complex and have a much smaller size, such as, for example, a 25 times smaller footprint in terms of area, and is directly integrated on the silicon layer.

Besides offering a low-cost integrated light source for silicon photonic microsystems, hybrid lasers provided according to the present example embodiments provide an incentive for expanding applications in an emerging 2-µm wavelength band, motivated by silicon's lower two-photon absorption and the recent development of efficient monolithic passive and active silicon devices in this range. Optical gain and lasing using a hybrid silicon rare-earth structure opens the door to highly compact monolithic optical amplifiers as well as new types of effective solid state light sources (e.g., tunable lasers), using the active functionality in the silicon layer, on silicon photonics platforms. The hybrid laser can be pumped at standard telecom wavelengths around 1.6 µm and emits around 1.9 µm, which is within an emerging spectral region of significant interest for communications, nonlinear and quantum optics, and sensing on silicon.

The compact design of the present example hybrid integrated silicon laser devices allows for straightforward and large-scale integration of such lasers within silicon photonic circuits, where potentially one pump could power multiple lasers (e.g., for wavelength division multiplexing applications or parallel sensors) by partially coupling pump power to each laser and efficiently tuning each laser onto resonance.

The silicon waveguide that is optically coupled to the doped-tellurium-oxide-coated resonant silicon structure may be integrated with one or more additional photonic devices that may include active devices, passive devices, and combinations thereof. Non-limiting examples of passive devices include directional couplers, ring resonators, and multimode interferometers, Mach Zehnder interferometers, waveguide Bragg gratings, and distributed Bragg reflectors, among others, which may be fabricated reliably using standardized wafer scale silicon processing technology. Such passive devices such as these can be used to design more advanced tellurite waveguide components, such as resonant cavities for non-linear frequency comb generators or rare earth lasers. Examples of active devices include amplifiers, lasers, nonlinear optical devices (e.g. devices capable of initiating nonlinear optical processes such as four-wave-mixing), acousto-optical devices such as acousto-optical filters and switches, frequency comb/multi-wavelengths sources for metrology, communications, precision clocks etc., and Raman amplifiers and lasers, modulators and photodetectors.

As described above, the ability to deposit the doped tellurium oxide layer using a low-temperature process facilitates the integration of silicon-based lasers into larger silicon photonic systems, using an end of line doped tellurium oxide film deposition step. Moreover, the present example hybrid integrated silicon laser devices can be integrated into 3D-integrated active silicon photonics platforms. Silicon photonics requires an efficient monolithic laser source for photonic signal generation. In some example implementations, the hybrid doped-tellurium-oxide-coated silicon lasers described herein may be employed to provide optical power sources for technology including but not limited to, optical computers, data centers, and digital information routing as a whole.

The broad range of wavelengths available by incorporating different and/or combinations of dopants in the tellurium oxide layer, and the capability of forming various active and passive device may also find applications beyond the communications field. For example, various example embodiments disclosed herein may be employed and adapted for applications involving quantum microsystems, monolithic and hybrid on-chip lasers, sensing and spectroscopic circuits, and may find application in additional fields such as metrology and medical diagnostics.

The following examples demonstrate single-mode a hybrid thulium-silicon laser integrated on a chip. The hybrid laser is ultra-compact and fabricated using standard silicon photonic processing methods and cost-effective, low-temperature and wafer-scale post-processing steps enabling large-scale integration, volume production and implementation within advanced silicon photonic microsystems. The laser emits at 1906 nm with a threshold pump power of 16 mW and 2.5 mW with respect to the power coupled into the silicon bus waveguide microdisk, respectively. Considering bidirectional emission, more than 1 mW total on-chip output power was observed and a slope efficiency versus absorbed pump power of 60%. This new, stable, compact, inexpensive, efficient, room temperature silicon laser has implications for ultra-compact light sources for silicon-based photonic microsystems in the emerging 2-μm wavelength band. Integrated silicon lasers are in high demand for applications including data communications, quantum information systems, artificial intelligence, nonlinear optical systems, mid-infrared light generation, humidity, gas and bio-sensors, detection and ranging, spectroscopy, and advanced metrology.

EXAMPLES

The following examples are presented to enable those skilled in the art to understand and to practice embodiments of the present disclosure. They should not be considered as a limitation on the scope of the disclosure, but merely as being illustrative and representative thereof.

Example 1: Laser Fabrication

Laser chips were fabricated on an SOI platform using the Advanced Micro Foundry (AMF) silicon photonics fabrication process in Singapore. Silicon strip bus waveguides of 0.45 μm width and microdisks with radii of 20 μm and gaps varying from 0.2-1.6 μm between the outer walls of the silicon disk and bus waveguide, were patterned using deep ultraviolet 193-nm lithography into a 0.22-μm-thick silicon waveguide layer on a 2 μm-thick $SiO_2$ buried oxide (BOX) layer, without top $SiO_2$ cladding, allowing for post-process $TeO_2:Tm^{3+}$ thin film deposition. The silicon waveguides were tapered from 0.45- to 0.18-μm width at the edge of the chip and deep trenches were etched into the BOX and silicon handle wafer to allow for low-loss fiber-chip light coupling. The SOI wafer was diced along the deep trenches into chips and the chips were transferred from the foundry. A 0.37-μm-thick $TeO_2:Tm^{3+}$ coating layer was then deposited onto the passive silicon chips at McMaster University using a radio frequency (RF) reactive magnetron co-sputtering process.

Three-inch metallic tellurium and thulium targets with 99.999 and 99.9% purity, respectively, were sputtered in an argon/oxygen atmosphere at ambient temperature. The Te and Tm RF sputtering powers were set to 120 W and 85 W, respectively, and the Ar and $O_2$ flow rates to 12 sccm and 9.4 sccm, respectively, at 20° C. The deposition rate for the $TeO_2:Tm^{3+}$ film was 13 nm/min and its refractive index was 2.04 at 638 nm and 1.99 at 1550 nm wavelengths measured by spectroscopic ellipsometry. $TeO_2:Tm^{3+}$ thin film propagation losses of 0.5 dB/cm at 1510 nm were determined using the prism coupling method and a separate film prepared on a thermally oxidized silicon substrate in the same deposition run. A thulium ion dopant concentration of $4.0 \times 10^{20}$ $cm^{-3}$ was measured using Rutherford backscattering spectrometry (RBS). The thulium ion dopant concentration of $4.0 \times 10^{20}$ $cm^{-3}$ was selected to be high enough to achieve greater gain than microdisk roundtrip losses, including propagation and disk-waveguide coupling losses. It is important to note that although the chips were unclad and passive-only in this study, the laser design allows for similar processing steps to be carried out on silicon photonic chips with active device layers, including metals and dopants, by etching a window into the top $SiO_2$ cladding (a standard processing step available within the silicon photonics foundry) and due to the low temperature $TeO_2:Tm^{3+}$ deposition.

A focused-ion-beam (FIB)-milled cross section of the silicon laser structure is displayed in FIG. 2A. FIG. 2B shows a top view scanning electron microscope (SEM) image of the hybrid laser.

Example 2: Laser Loss and Gain Calculations

The electric field profiles and intensity overlap factors of the hybrid $TeO_2:Tm^{3+}$-silicon waveguide and microdisk modes and radiation losses of the microdisk were calculated using a finite-element method modesolver (RSoft FemSIM) and the cross-sectional structure shown in FIG. 3. The microdisk cavity Q factor was converted to an equivalent propagation loss. The maximum $Tm^{3+}$ gain achievable in the resonator, $\gamma_{Tm}$ (in dB/cm), was calculated using the following equation:

$$\gamma_{Tm} = 10 \log_{10} e \times \Gamma \times \sigma_{21} \times N_{Tm}$$

where $\Gamma$ and $\sigma_{21}$ are the intensity overlap factor and $Tm^{3+}$ ion emission cross section on the $^3F_4$-$^3H_6$ transition estimated for tellurite glass, respectively, at the laser wavelength, $N_{Tm}$ is the $Tm^{3+}$ ion concentration and full $Tm^{3+}$ population inversion was assumed to give an upper limit to the gain. It is noted that by using similar calculations for the hybrid bus waveguide structure, the total thulium-related pump absorption and laser signal enhancement in the waveguide were determined to be <1 dB and have minimal impact on the pump threshold power and laser output power, respectively.

Example 3: Laser Measurements

Figure 7:
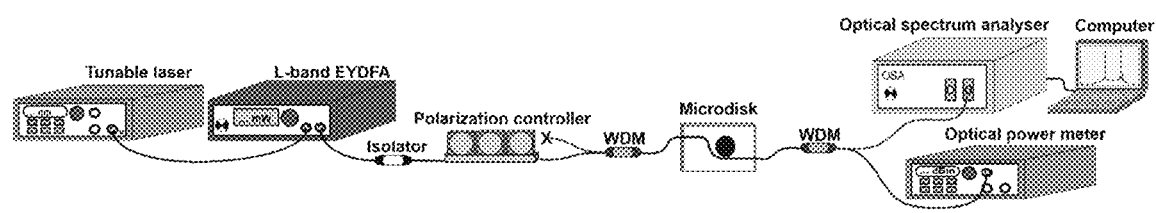
FIG. 7 shows the experimental setup used for measuring the on-chip hybrid $TeO_2$:$Tm^{3+}$-coated silicon microdisk lasers.

The passive and active properties of the silicon microdisk laser were characterized using the experimental setup shown in FIG. 7. Polarized pump light was coupled from a tunable 1520-1640 nm laser set at ~1610 nm and a high-power L-band erbium-ytterbium-co-doped fiber amplifier (L-band EYDFA) to the chip via a fiber polarization controller, a 1600/1900 nm fiber wavelength division multiplexor (WDM), and a 2-μm spot size at 1550-nm wavelength tapered optical fiber mounted on an xyz alignment stage. The microdisk laser output was also coupled from the chip using a tapered fiber mounted on an xyz stage, filtered from the pump light with a 1600/1900 nm WDM, and coupled to an optical spectrum analyzer (OSA) to observe the output spectrum. The transmitted pump light was also measured using an optical power meter. During measurements the polarization paddles and xyz stages were adjusted to select TE polarization and maximize the off-resonance transmitted pump/signal intensity. The fiber-chip coupling loss at 1610 nm was determined to be 7.5 dB, influenced by mode mismatch, Fresnel reflections and scattering due to the conformal $TeO_2:Tm^{3+}$ coating on the facet. It was determined that the launched pump power by measuring the incident power from the input fiber using an integrating sphere photodiode power monitor and accounting for fiber-chip coupling loss. Transmission measurements were carried out on the same setup without the L-band EYDFA and the OSA replaced with a photodetector to determine the background microdisk propagation loss. The transmission in the wavelength range of 1520 to 1540 nm was measured and negligible thulium absorption loss was observed, and the fitted intrinsic Q factor can be assumed to represent the passive propagation loss of the structure.

Example 4: Device Simulation and Experimental Results

The calculated optical properties of the hybrid $TeO_2$:$Tm^{3+}$-Si resonator structure are summarized in FIG. 3. The electric field profiles of the transverse-electric- (TE-) polarized fundamental modes for the microdisk resonator and waveguide and 1610-nm pump wavelength are displayed in FIG. 3 (top left and top right, respectively). Similarly, the TE-polarized fundamental modes for the microdisk and waveguide at the laser wavelength of 1906 nm are also shown in FIG. 3 (bottom left and bottom right, respectively). To achieve gain in the disk resonator structure, a sufficient percentage of optical intensity should overlap with the $TeO_2$:$Tm^{3+}$ gain material.

The theoretical properties of the pump and laser modes in the microdisk structure are displayed in FIG. 4. For the microdisk resonator, approximately 15% and 19% of the optical power is confined in the $TeO_2$:$Tm^{3+}$ coating at the pump and laser wavelengths, respectively. Because of strong optical confinement in the silicon disk, low loss and a relatively high $Tm^{3+}$ concentration are beneficial for sufficient amplification in the resonator and to achieve roundtrip net gain and lasing. The propagation loss in the microdisk includes contributions from the Si, $TeO_2$ and $SiO_2$ linear absorption, Si nonlinear (two-photon) absorption, $Tm^{3+}$ absorption, scattering loss at interfaces and bending radiation loss. Linear absorption is low for all materials used in the hybrid resonator. The two-photon absorption coefficient at 1.9 μm is about half that at 1.5 μm, thus nonlinear absorption and its influence on the roundtrip gain are expected to be minimal near the lasing threshold.

Since $Tm^{3+}$ absorption at the laser wavelength is also low because of the small $Tm^{3+}$ absorption cross section around 1900 nm, in the present design, it is expected to be limited by the bending radiation and scattering loss, the former of which can be designed to be low by selecting an appropriate bending radius and the latter of which is limited by fabrication steps such as etching and must be extracted from experiment.

Figure 5:
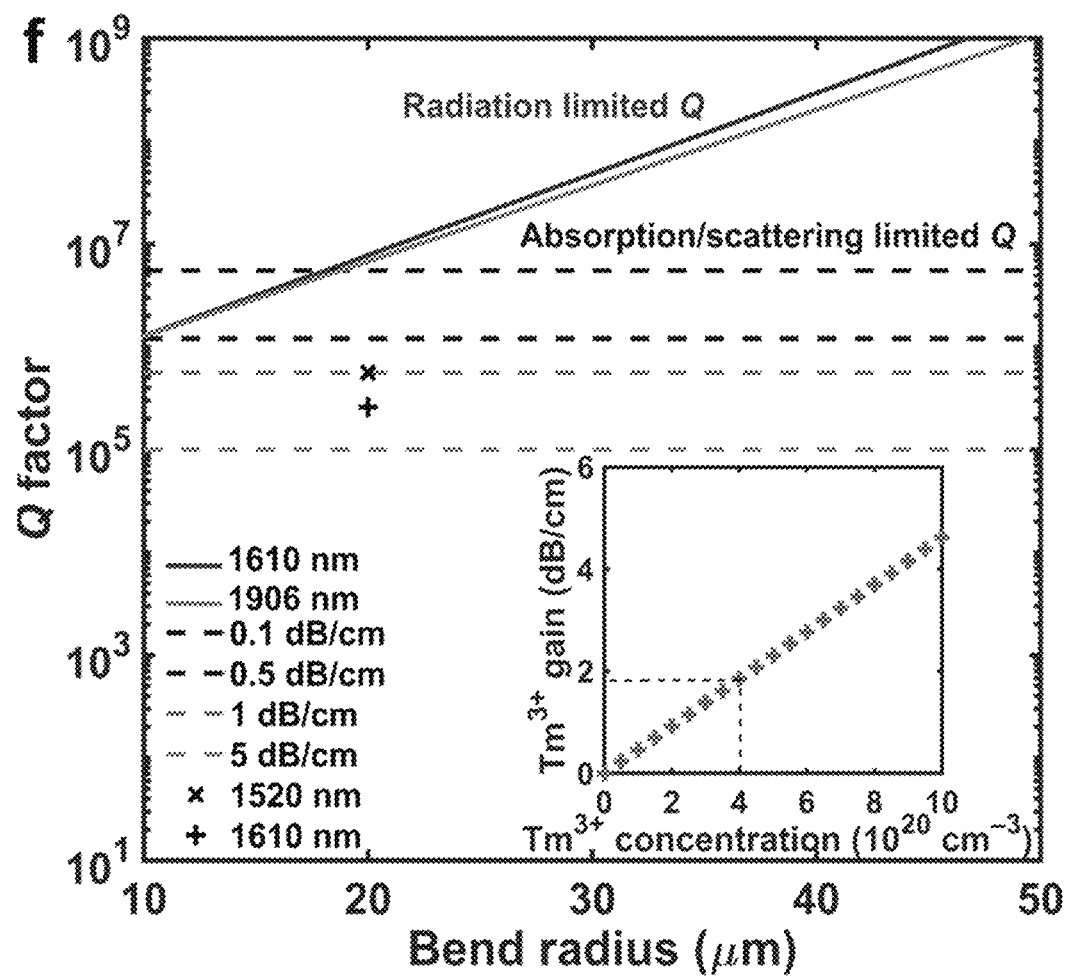
FIG. 5 plots calculated internal Q factor of the hybrid silicon microdisk laser at the pump and lasing wavelengths. The measured Q factors at 1521 and 1610 nm wavelength and 20 μm bend radius are also indicated with lines shown for several resonator losses, showing that the internal Q is limited by the absorption and scattering related propagation loss of the microdisk. The inset shows the calculated upper limit $Tm^{3+}$ gain versus thulium concentration in the hybrid resonator.

The theoretical radiation loss and equivalent Q factor for the $TeO_2$:$Tm^{3+}$-coated silicon microdisk structure was calculated using a finite element bent eigenmode solver, as shown in FIG. 5. The calculated radiation limited Q factor at pump and laser wavelengths shows that radiation loss is negligible at the selected bend radius of 20 μm. These results show that such disks can be effectively designed with a 20-μm radius and below before introducing significant radiation losses, potentially allowing for the fabrication of more compact devices than reported here. When the bending loss is negligible the internal Q factor of the microdisk becomes limited by absorption and scattering losses, which are independent of bend radius. The dashed lines in FIG. 5 indicate the internal Q factors corresponding to different absorption/scattering-limited microdisk propagation losses. To achieve roundtrip gain and lasing in the cavity, the gain must exceed the cavity losses, including radiation, absorption/scattering loss and resonator-waveguide coupling loss. The inset in FIG. 5 shows the calculated upper limit of the Tm gain for different Tm concentrations, including the Tm concentration selected in this study. These results show that net roundtrip gain is achievable, accounting for the fact that the resonators are point-coupled and in the under-coupled regime and the coupling coefficient is low.

Figure 6A:
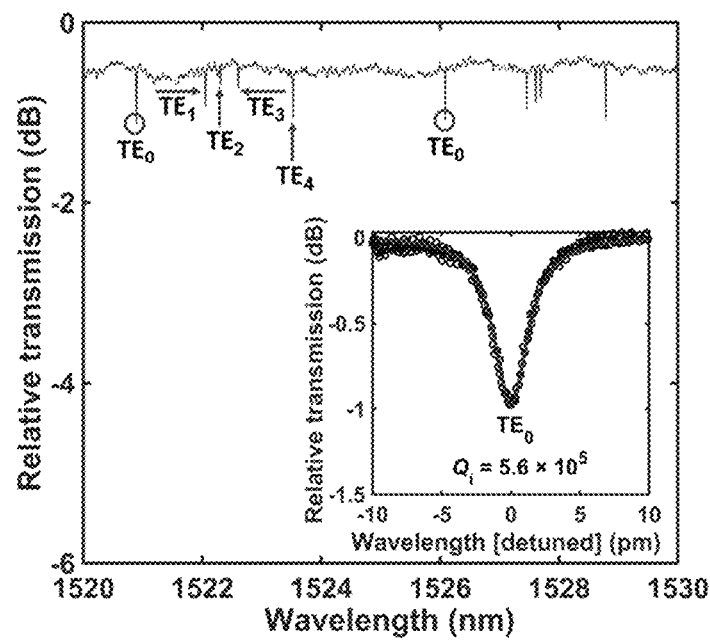
FIG. 6A shows the measured TE transmission spectrum for a $TeO_2$:$Tm^{3+}$-coated silicon microdisk with a microdisk-waveguide gap of 0.6 μm. Inset: a close-up view of the under coupled resonance at 1521 nm wavelength with extinction ratio of 0.95 dB and a fitted Lorentzian function yielding an intrinsic quality factor, $Q_i$, of $5.6 \times 10^5$ corresponding to 1 dB/cm background optical propagation loss.

The passive transmission properties of the microdisk resonator were characterized using a tunable laser and a fiber probe station. As displayed in FIG. 6A, narrow resonances associated with five different TE modes supported by the microdisk resonator were observed. The extinction ratios are relatively low (≤1 dB), indicating the resonator is in the under-coupled regime. In this regime higher roundtrip gain can be achieved, increasing the probability of lasing, with the tradeoff that lower pump-power is coupled into the resonator resulting in reduced efficiency. By fitting the transmission responses of the under-coupled resonator using a Lorentzian function (shown in the inset of FIG. 6A), an internal quality factor, $Q_i$, of $5.6 \times 10^5$ at 1521 nm was obtained. This $Q_i$ corresponds to a propagation loss of 1.0 dB/cm in the microdisk cavity. An even lower background propagation loss at the laser wavelength around 1900 nm was expected. An internal quality factor of $2.7 \times 10^5$ was obtained, corresponding to 1.9 dB/cm propagation loss at the pump wavelength of 1610 nm, confirming the higher $Tm^{3+}$ ion absorption loss at this wavelength. These measurements are also shown on the plot in FIG. 5 and confirm that the Q factor is limited by $Tm^{3+}$ absorption, background material loss and scattering loss inherent to the hybrid disk structure.

Figure 6B:
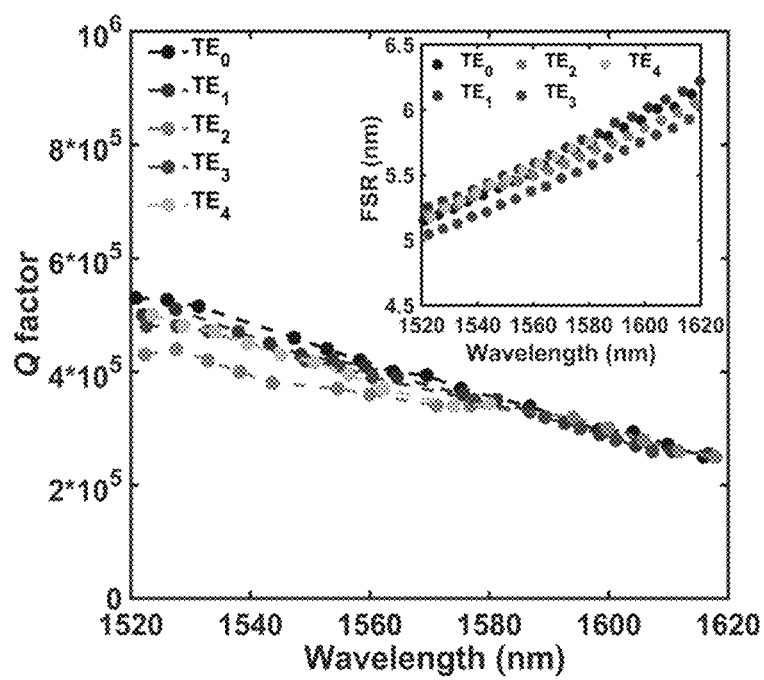
FIG. 6B shows the microdisk intrinsic quality factor versus wavelength confirming the onset of thulium absorption at longer wavelengths. Inset: free spectral ranges (FSRs) of the microdisk modes versus wavelength.

In FIG. 6B, the internal quality factors were measured for various resonant modes and associated free spectral ranges (FSRs) (shown in the inset of FIG. 6B), in transmission experiments from 1520 nm to 1620 nm wavelength. The various microdisk modes show Q factors with similar magnitude and wavelength dependence, indicating similar background loss and mode overlap with the silicon and $TeO_2$:$Tm^{3+}$ layers. The relatively large FSR of >5 nm for the design increases the likelihood of single-mode as opposed to multi-mode lasing observed in previous integrated Tm microcavity lasers and allows for engineering of the laser output wavelength by small adjustments in the resonator dimensions. The FSRs match well with those predicted via calculation and allow for the confirmation of pumping on the fundamental TE microdisk mode.

Figure 8A:
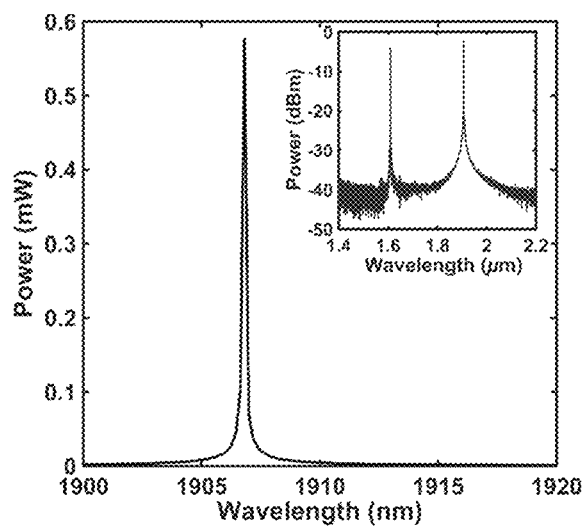
FIG. 8A plots the single mode laser emission spectrum at 1906 nm of a $TeO_2$:$Tm^{3+}$-coated Si microdisk resonator under 1610-nm pumping at a microdisk-waveguide gap of 0.6 μm obtained with 32.4 mW on-chip pump power. Inset: laser emission spectrum with a side-mode suppression of >30 dB.
Figure 8B:
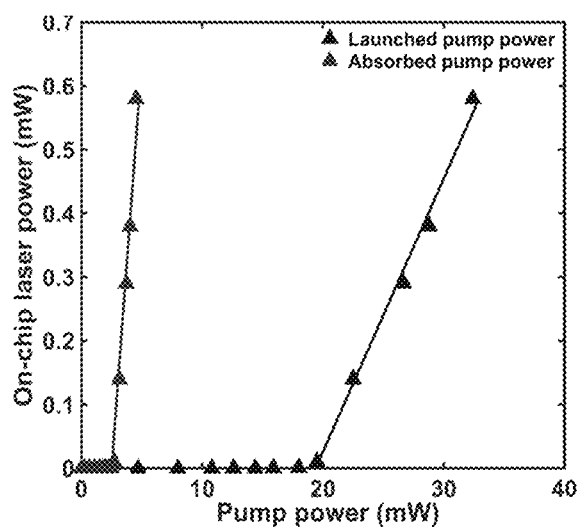
FIG. 8B plots the laser output curve showing a single-sided on-chip output power of up to 580 μW, slope efficiencies of 4.2% and 30% versus on-chip launched and absorbed 1610 nm pump power, and threshold pump powers of 16 mW in the bus waveguide and 2.5 mW in the microdisk resonator.

A schematic of the measurement setup used to characterize the lasers is displayed in FIG. 7. The $TeO_2$:$Tm^{3+}$-Si hybrid microdisk laser results are shown in FIGS. 8A and 8B. The $TeO_2$:$Tm^{3+}$-coated Si microdisk resonators were resonantly pumped to investigate their lasing potential, with up to 32.4 mW power launched into the bus waveguide. Lasing was observed for a disk-bus gap of 0.6 μm and the highest slope efficiency and laser output power were observed for pumping at the fundamental TE mode around 1610 nm. The laser output is bidirectional and similar output power at the pump input side of the chip was observed.

As shown in FIG. 8A, a single-mode silicon microdisk laser output spectrum was observed with up to 580 μW single-sided on-chip power and 1.16 mW double-sided output power. The inset shows the pump transmission and laser output spectrum measured at the chip output. A single laser line at 1906 nm is evident with a side-mode suppression of >30 dB.

The laser output signal was observed to be highly stable at room temperature without thermal control of the substrate or any adjustment of the pump wavelength required, even though the device is pumped on a narrow resonance. This is a result of silicon's relatively strong thermo-optic effect which provides a natural closed-loop system for the microdisk laser when pumped on the blue-side of resonance. Stable operation was observed for at least 9 hours under 29 mW of pumping, with no external thermal stabilization of the laser chip. As shown in FIG. 8B, lasing was observed at a threshold pump power of 16 mW launched into the bus waveguide and 2.5 mW coupled into the microdisk resonator. The single-sided laser slope efficiency versus launched and microdisk-coupled pump power is 4.2% and 30%, respectively, which yields a bidirectional slope efficiency with respect to absorbed pump power of up to 60%.

Example 5: Low-Threshold Device Based on Pulley-Coupled Waveguides

In the present example, low-threshold lasing is demonstrated for hybrid-integrated thulium-doped tellurium oxide silicon microdisk lasers based on a pulley-coupled design. The resonators are fabricated on a silicon-on-insulator (SOI) wafer using a standard foundry process and the gain medium is deposited using a straightforward, low-temperature post processing step. Lasing is shown in 40 and 60 µm diameter microdisks with >2 mW double-sided output power and slope efficiencies of up to 13.4% with respect to 1620 nm pump power launched to the bus waveguide. Both single-mode and multimode laser emission is observed spanning across wavelengths from 1825 to 1939 nm with the thresholds of <1 mW versus launched pump power. These low threshold lasers with emission over a >100 nm range have prospective applications in data communications, quantum information systems, artificial intelligence, nonlinear optical systems and open the door to highly compact monolithic PICs with optical gain on silicon photonics platforms in the emerging ~1.8-2.0 µm wavelength band.

The thulium-doped tellurium oxide waveguide lasers were fabricated in a silicon photonics foundry on a wafer-scale SOI platform using the Advanced Micro Foundry (AMF) silicon photonics fabrication process in Singapore. Deep ultraviolet 193-nm lithography was used to pattern the silicon microdisks into a 0.22-µm-thick silicon waveguide layer on a 2 µm-thick SiO2 buried oxide (BOX) layer, without top SiO2 cladding, allowing for a monolithic, post-processing deposition of the gain medium on top of the devices. A room-temperature reactive radio frequency (RF) co-sputtering post-processing step was used to coat the entire structure in a 385-nm-thick thulium-doped tellurium oxide (TeO2:$Tm^{3+}$) film. Three-inch metallic tellurium and thulium targets with 99.999 and 99.9% purity, respectively, were sputtered in an argon/oxygen atmosphere at ambient temperature. Tellurite glass was selected for its high refractive index, enabling improved optical mode overlap, high rare-earth solubility and high optical gain.

Figure 9:
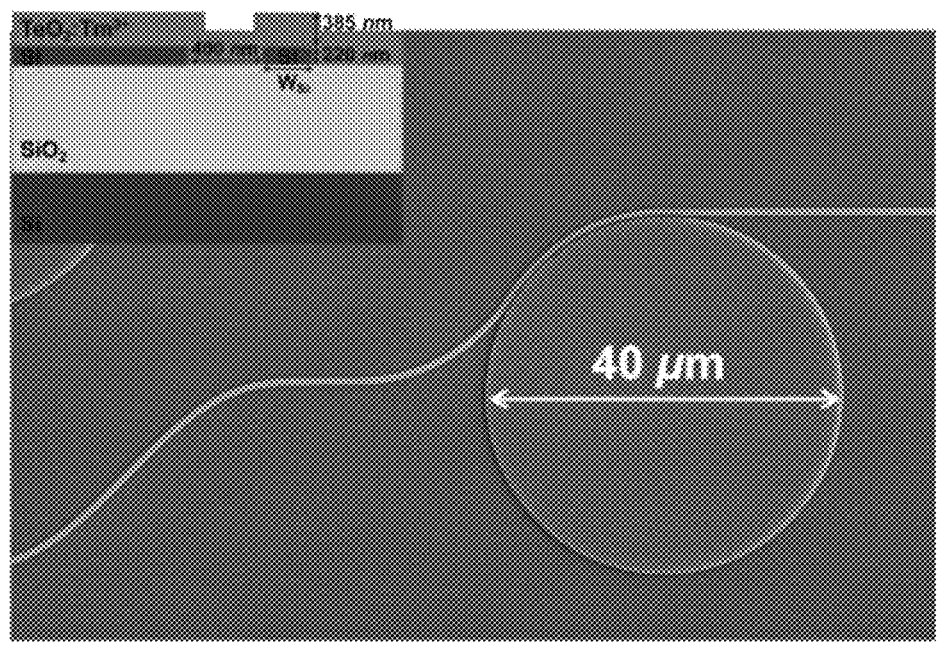
FIG. 9 shows a top-view SEM image of a TeO2:Tm3+-coated Si microdisk laser with a radius of 20 μm radius with the bus waveguide pulley coupled around the resonator. The inset shows the cross-section profile of the TeO2:$Tm^{3+}$-Si microdisk structure.

The prism coupling method was used to determine a TeO2:$Tm^{3+}$ thin-film propagation loss of ≤0.3 dB/cm at 1510 nm. A top-view scanning electron microscope (SEM) image of silicon microdisk laser and inset cross-section diagram with disk and waveguide dimensions are shown in FIG. 9. Disks were fabricated with radii of 20 and 30 µm and 60° pulley-coupled single-mode strip Si waveguides. Compared to the point-coupled design described above, the pulley-coupled design enables more versatility in adjusting the pump input and laser output coupling strength. The microdisk lasers were characterized using a fiber-chip probe station with a tunable laser set at 1620 nm connected to a high-power L-band erbium-ytterbium-co-doped fiber amplifier to amplify the pump laser. The TeO2:$Tm^{3+}$-coated Si microdisk resonators were resonantly pumped to investigate their lasing potential with up to 20 mW power launched into the bus waveguide.

Figure 10:
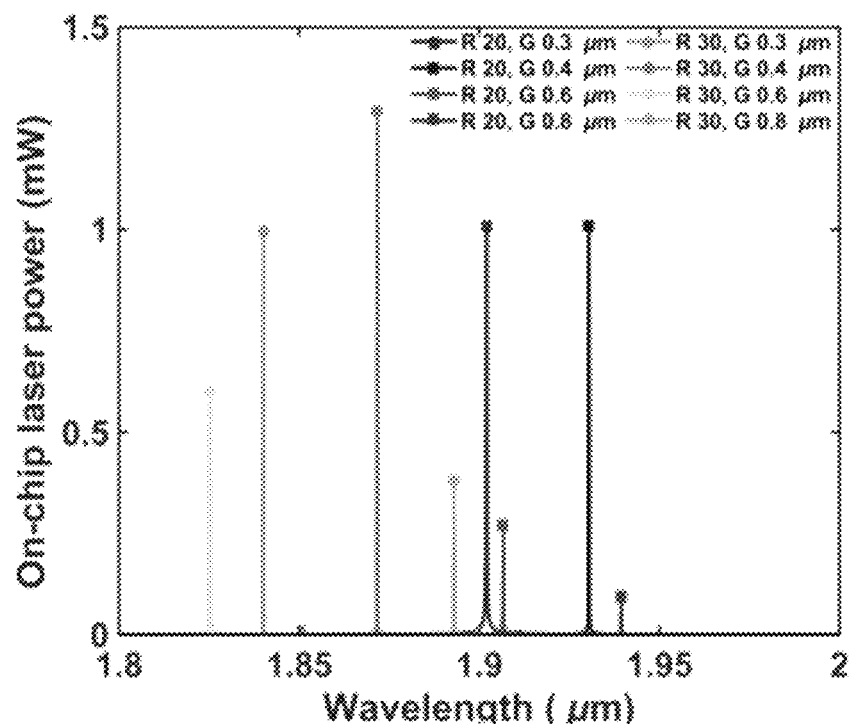
FIG. 10 shows laser emission spectra of TeO2:$Tm^{3+}$-Si microdisk resonators under 1620-nm pumping and for microdisk-waveguide gaps ranging from 0.3 μm to 0.8 μm for 20 μm and 30 μm microdisk radii. The laser emission shifts from 1825 to 1939 nm by changing the gap size.
Figure 11:
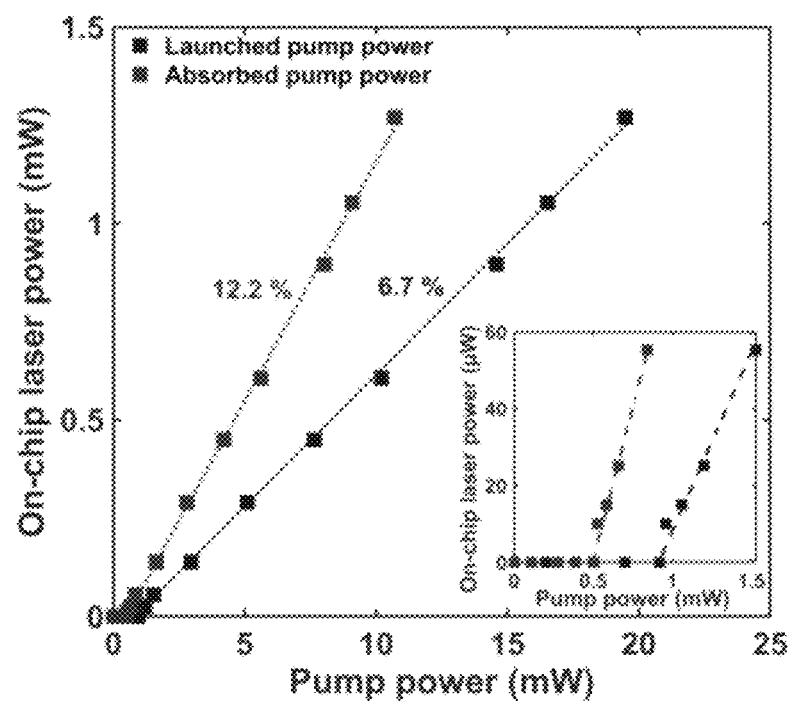
FIG. 11 shows single-sided on-chip output power of up to 1.3 mW with a slope efficiency of 6.7% versus on-chip launched power pumped at 1620 nm and a threshold pump power of 918 μW in the bus waveguide are demonstrated in a 30-μm radius microdisk resonator.

Laser spectra obtained under 1620-nm pumping and at different gaps of 0.3, 0.4, 0.6, and 0.8 µm is shown in FIG. 10. Lasing is observed at wavelengths spanning from 1825 to 1939 nm in different devices. Single-mode lasing is observed at 1930 nm with up to 2 mW double-sided on-chip power in a 20 µm radius microdisk resonator with a gap of 0.4 µm and multi-mode lasing at 1872 nm with up to 2.6 mW double-sided on-chip power in a 30 µm radius microdisk resonator with a gap of 0.4 µm. Low thresholds are observed and the laser output signal to be highly stable at room temperature without thermal control of the substrate or any adjustment of the pump wavelength required, even though the device is pumped on a narrow resonance. As shown in FIG. 11, a threshold pump power of 918 µW launched into the bus waveguide and 505 µW coupled into the microdisk resonator with 30 µm radius was measured. The single-sided laser slope efficiency versus launched and absorbed pump power is 6.7 and 12.2%, respectively.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. An optical system comprising:
   an optical device comprising:
   a substrate;
   a dielectric layer formed on said substrate, said dielectric layer having a refractive index less than that of silicon;
   a silicon waveguide formed on said dielectric layer;
   a silicon-based laser cavity formed on said dielectric layer, said silicon-based laser cavity comprising:
   a silicon resonant base structure; and
   a doped tellurium oxide layer formed on said silicon resonant base structure, said doped tellurium oxide layer comprising a rare earth dopant; and
   a pump laser configured to deliver pump laser energy to said silicon waveguide;
   wherein said silicon-based laser cavity is optically coupled to said silicon waveguide such that at least a portion of the pump laser energy propagating through said silicon waveguide is coupled to said silicon-based laser cavity for excitation of said rare earth dopant within said doped tellurium oxide layer; and
   wherein a thickness of said doped tellurium oxide layer and a concentration of said rare earth dopant are selected to facilitate gain and lasing for at least one resonant mode within said silicon-based laser cavity in response to excitation of said rare earth dopant by said pump laser energy, said at least one resonant mode having a modal volume that extends from said silicon resonant base structure into said doped tellurium oxide layer; and
   wherein laser energy generated within said silicon-based laser cavity is coupled to and propagates within said silicon waveguide.

2. The optical system according to claim 1 wherein said silicon resonant base structure comprises a silicon microdisk.

3. The optical system according to claim 1 wherein said rare earth dopant comprises Thulium.

4. The optical system according to claim 3 wherein a pump wavelength of said pump laser is selected such that stable lasing is achieved in the absence of active thermal regulation of said silicon-based laser cavity.

5. The optical system according to claim 3 wherein said laser energy has a wavelength between 1.7 and 2.1 microns.

6. The optical system according to claim 3 wherein said silicon waveguide is in optical communication with or forms a portion of a silicon-waveguide-based integrated optical device, integrated on said substrate, said silicon-waveguide-based integrated optical device being configured for operation with an operating wavelength band that resides within the range of 1.7 and 2.1 microns.

7. The optical system according to claim 1 wherein said rare earth dopant comprises Erbium.

8. The optical system according to claim 1 wherein said silicon resonant base structure comprises a silicon ring resonator or silicon racetrack resonator.

9. The optical system according to claim 1 wherein said silicon waveguide is pulley-coupled to said silicon-based laser cavity.

10. The optical system according to claim 1 wherein said silicon resonant base structure comprises a distributed-feedback waveguide segment that is directly integrated with said silicon waveguide.

11. The optical system according to claim 1 wherein said silicon resonant base structure is a Fabry-Perot cavity or a loop mirror cavity.

12. The optical system according to claim 1 wherein said silicon waveguide has a height between 10 and 4000 nm and is fully etched down to said dielectric layer to form a strip waveguide.

13. The optical system according to claim 1 wherein said silicon waveguide has a height between 10 and 4000 nm and is partially etched to form a ridge waveguide.

14. The optical system according to claim 1 wherein the thickness of said doped tellurium oxide layer is between 10 to 10000 nm.

15. The optical system according to claim 1 wherein said doped tellurium oxide layer and said silicon resonant base structure have dimensions such that said at least one resonant mode has an effective mode area less than 100 square microns.

16. The optical system according to claim 1 wherein said doped tellurium oxide layer resides on at least a portion of said silicon waveguide, thereby forming a hybrid silicon-tellurium-oxide waveguide.

17. The optical system according to claim 16 wherein said doped tellurium oxide layer and said silicon waveguide have dimensions such that said hybrid silicon-tellurium-oxide waveguide has a minimum bend radius of less than 1 mm.

18. The optical system according to claim 1 wherein said silicon-based laser cavity is evanescently coupled to said silicon waveguide, and wherein a gap between said silicon waveguide and said silicon-based laser cavity is less than 10 µm.

19. The optical system according to claim 1 wherein a resonant property of said silicon resonant base structure is formed by one or more patterning features.

20. The optical system according to claim 1 wherein said silicon waveguide is in optical communication with or forms a portion of a silicon-waveguide-based integrated optical device, integrated on said substrate, said silicon-waveguide-based integrated optical device further comprising an integrated optical component selected from the group consisting of a directional coupler, multimode interferometer, Mach Zehnder interferometer, waveguide Bragg grating, and distributed Bragg reflector.

21. The optical system according to claim 1 wherein said silicon waveguide is in optical communication with or forms a portion of a silicon-waveguide-based integrated optical device, integrated on said substrate, said silicon-waveguide-based integrated optical device further comprising an integrated optical component selected from the group consisting of amplifiers, lasers, nonlinear optical devices, acousto-optical devices, multiwavelength sources, and optical sensors.

22. The optical system according to claim 1 wherein said doped tellurium oxide layer is in direct contact with at least a portion of said silicon resonant base structure.

23. The optical system according to claim 1 wherein said dielectric layer is a first dielectric layer, and wherein an intermediate dielectric layer is provided between said doped tellurium oxide layer and said silicon resonant base structure.

24. The optical system according to claim 1 wherein an additional metal heater layer is included proximal to said silicon-based laser cavity to facilitate thermal tuning of resonant properties of said silicon-based laser cavity.

25. The optical system according to claim 1 wherein said silicon resonant base structure is doped to facilitate tuning of resonant properties of said silicon-based laser cavity by heating.

26. The optical system according to claim 1 wherein said silicon resonant base structure is doped to enable injection or depletion of charge carriers.

27. An integrated optical device comprising:
a substrate;
a dielectric layer formed on said substrate, said dielectric layer having a refractive index less than that of silicon;
a silicon waveguide formed on said dielectric layer;
a silicon-based laser cavity formed on said dielectric layer, said silicon-based laser cavity comprising:
a silicon resonant base structure; and
a doped tellurium oxide layer formed on said silicon resonant base structure, said doped tellurium oxide layer comprising a rare earth dopant; and
wherein said silicon-based laser cavity is optically coupled to said silicon waveguide such that when pump laser energy having a suitable wavelength is delivered to said silicon waveguide, at least a portion of the pump laser energy is coupled to said silicon-based laser cavity for excitation of said rare earth dopant within said doped tellurium oxide layer; and
wherein a thickness of said doped tellurium oxide layer and a concentration of said rare earth dopant are selected to facilitate gain and lasing for at least one resonant mode within said silicon-based laser cavity in response to excitation of said rare earth dopant by the pump laser energy, said at least one resonant mode having a modal volume that extends from said silicon resonant base structure into said doped tellurium oxide layer.

28. A method of forming the integrated optical device of claim 27, the method comprising:
providing a structure comprising the substrate, the dielectric layer formed on the substrate, and a silicon layer residing on the dielectric layer;
processing the structure to define thereon:
the silicon waveguide; and
the silicon resonant base structure; and
depositing, according to a low-temperature deposition process with a temperature below 300 degrees Celsius, the doped tellurium oxide layer comprising the rare earth dopant, such that the doped tellurium oxide layer is formed over at least the silicon resonant base structure, thereby forming the silicon-based laser cavity,
wherein the silicon waveguide and the silicon resonant base structure are defined such that the silicon-based laser cavity is optically coupled to the silicon waveguide, and such that when the pump laser energy having the suitable wavelength is delivered to the silicon waveguide, at least a portion of the pump laser energy is coupled to the silicon-based laser cavity for excitation of the rare earth dopant within the doped tellurium oxide layer; and wherein the thickness of the doped tellurium oxide layer and the concentration of the rare earth dopant are selected to facilitate gain and lasing for the at least one resonant mode within the silicon-based laser cavity in response to excitation of the rare earth dopant by the pump laser energy; the at least one resonant mode having the modal volume that extends from the silicon resonant base structure into the doped tellurium oxide layer.

29. The method according to claim 28 wherein the structure is processed to form at least one passive integrated optical component prior to deposition of the doped tellurium oxide layer, the at least one passive integrated optical component being in optical communication with the silicon waveguide.

30. The method according to claim 28 wherein the structure is processed to form at least one active integrated optical component prior to deposition of the doped tellurium oxide layer, the at least one active integrated optical component being in optical communication with the silicon waveguide.

31. The method according to claim 28 wherein a resonant feature of the silicon resonant base structure is formed by a patterning step prior to depositing the doped tellurium oxide layer.

32. The method according to claim 28 further comprising forming an intermediate dielectric layer one or both of the silicon waveguide and the silicon resonant base structure prior to depositing the doped tellurium oxide layer.

33. The method according to claim 28 wherein, prior to deposition of the doped tellurium oxide layer, an additional dielectric layer with refractive index lower than silicon is deposited on the silicon resonant base structure and a window is etched into the additional dielectric layer.

34. An integrated optical device comprising:
a substrate;
a dielectric layer formed on said substrate, said dielectric layer having a refractive index less than that of silicon;
a silicon waveguide formed on said dielectric layer;
a silicon-based laser cavity formed on said dielectric layer, said silicon-based laser cavity comprising:
a silicon resonant base structure; and
a doped metal oxide layer formed on said silicon resonant base structure, said doped metal oxide layer comprising a rare earth dopant; and
wherein said silicon-based laser cavity is optically coupled to said silicon waveguide such that when pump laser energy having a suitable wavelength is delivered to said silicon waveguide, at least a portion of the pump laser energy is coupled to said silicon-based laser cavity for excitation of said rare earth dopant within said doped metal oxide layer; and
wherein a thickness of said doped metal oxide layer and a concentration of said rare earth dopant are selected to facilitate gain and lasing for at least one resonant mode within said silicon-based laser cavity in response to excitation of said rare earth dopant by the pump laser energy, said at least one resonant mode having a modal volume that extends from said silicon resonant base structure into said doped metal oxide layer.

\* \* \* \* \*